(12) United States Patent
Biggs et al.

(10) Patent No.: US 12,503,173 B2
(45) Date of Patent: *Dec. 23, 2025

(54) ANGLE-ADJUSTABLE CONNECTOR

(71) Applicants: Ira Biggs, Staunton, VA (US); Steven Hartman, Churchville, VA (US)

(72) Inventors: Ira Biggs, Staunton, VA (US); Steven Hartman, Churchville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,312

(22) Filed: Dec. 12, 2023

(65) Prior Publication Data

US 2024/0317326 A1 Sep. 26, 2024

Related U.S. Application Data

(63) Continuation of application No. 18/125,343, filed on Mar. 23, 2023, now Pat. No. 11,873,032.

(51) Int. Cl.
*B62D 33/00* (2006.01)
*B62D 33/023* (2006.01)
*B62D 33/03* (2006.01)
*B62D 63/08* (2006.01)

(52) U.S. Cl.
CPC .......... *B62D 33/03* (2013.01); *B62D 33/023* (2013.01); *B62D 63/08* (2013.01)

(58) Field of Classification Search
CPC .... B62D 33/08; B62D 63/08; B62D 33/0207; B62D 33/023; B62D 33/033; B62D 33/037; B62D 33/03; E05D 11/1085; E05D 11/1035
USPC ... 296/3, 10, 14, 36, 43, 26.06, 26.07, 186.4
See application file for complete search history.

(56) References Cited

U.S. PATENT DOCUMENTS

| | | | | | |
|---|---|---|---|---|---|
| 2,828,931 | A | * | 4/1958 | Harvey | F16M 3/00 410/46 |
| 2,856,225 | A | * | 10/1958 | Selzer | B62D 33/08 296/43 |
| 4,278,284 | A | * | 7/1981 | Ohlson | B62D 33/033 296/57.1 |
| 6,698,983 | B1 | * | 3/2004 | Kiernan | A61G 3/0808 410/23 |
| 7,252,317 | B2 | * | 8/2007 | Boe | B62D 33/027 296/181.7 |
| 11,873,032 | B1 | * | 1/2024 | Biggs | B62D 63/08 |

* cited by examiner

*Primary Examiner* — Stephen T Gordon
(74) *Attorney, Agent, or Firm* — New River Valley IP Law, P.C.; Ashley M. Gates; Michele L. Mayberry

(57) ABSTRACT

Angle-adjustable connectors and modular systems capable of securing angle-adjustable side rails to trailers and/or trucks are described. The angle-adjustable connectors comprise a first component capable of attaching to a universal bracket of a trailer and a second component capable of securing one or more rail at a position disposed at a desired angle relative to the first component and/or a bed of the trailer or truck.

20 Claims, 11 Drawing Sheets

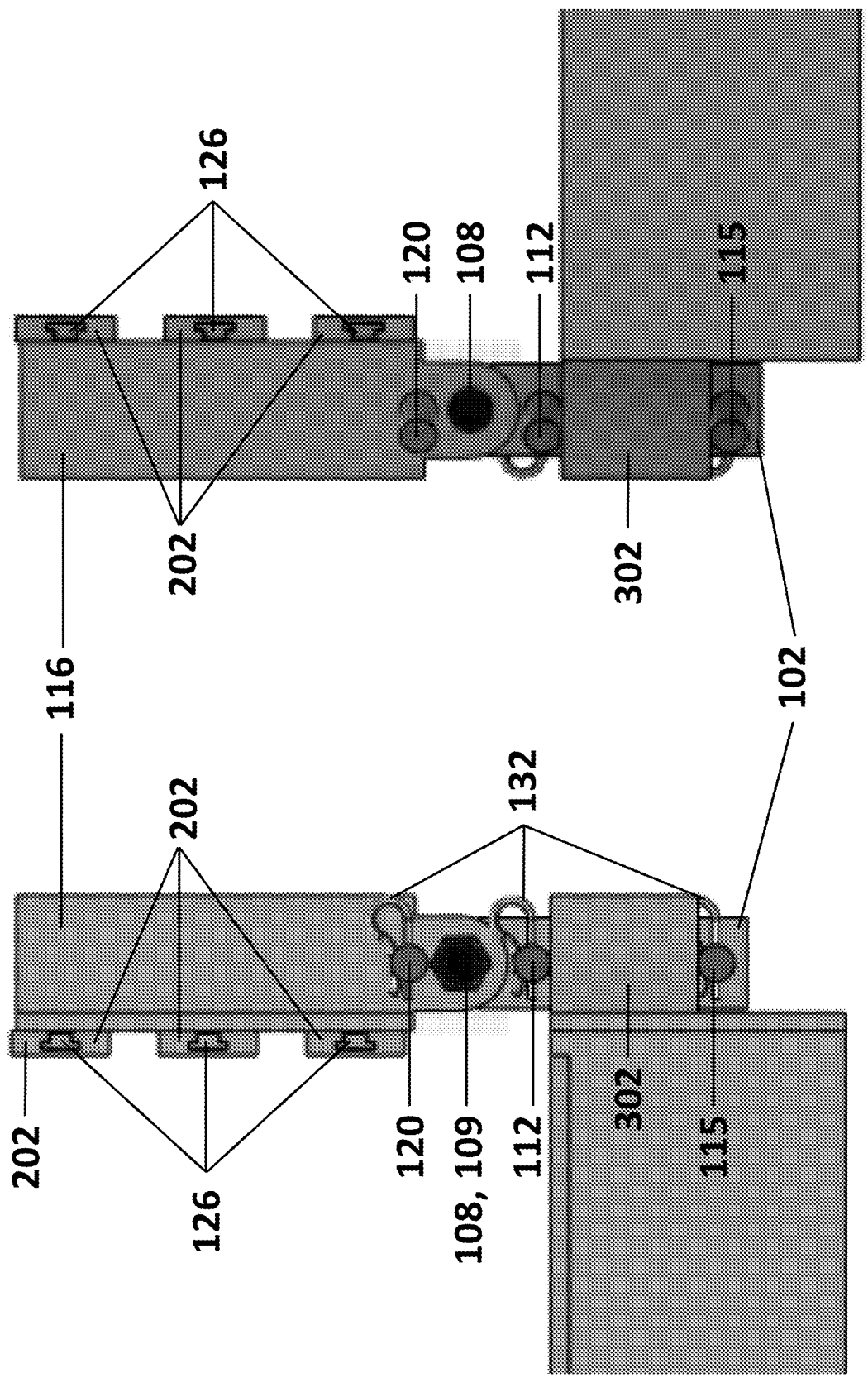

ANGLE-ADJUSTABLE CONNECTOR

CROSS-REFERENCE TO RELATED APPLICATION

This application is a Continuation application of U.S. patent application Ser. No. 18/125,343, filed Mar. 23, 2023, which is hereby incorporated by reference herein in its entirety.

BACKGROUND OF THE INVENTION

Field of the Invention

The present invention relates to the field of angle-adjustable connection devices. More particularly, the present invention comprises angle-adjustable connectors for attaching angle-adjustable side rails to flatbed trailers or trucks.

Description of Related Art

Flatbed trailers are commonly used to safely transport off-road vehicles, such as UTVs and ATVs, from one location to another. Some flatbed trailers allow for convenient loading and unloading by incorporating drop-side or removable rails or panels. For example, U.S. Pat. No. 9,758,198 provides hinged stakes for attaching drop-side panels to flatbed trucks. U.S. Patent Application Publication No. 2021/0221447 discloses hinged drop-in flatbed side panels. U.S. Pat. No. 4,216,988 provides for removable, pivotable side walls for a vehicle body. U.S. Pat. No. 9,932,078 discloses a utility trailer with rotatable side panels.

One method of maximizing the number of off-road vehicles that can be transported on a single trailer is to place the vehicles on the trailer such that they are facing to the side. On a standard-sized trailer, the wheels of a typical ATV or UTV would be near the edges of the trailer such that standard drop-side and/or removable panels or rails would not fit and/or latch. Alternatively, safety straps can be used to secure the vehicles; however, if a strap fails, nothing will prevent the vehicle from rolling off the side of the trailer.

Angle-adjustable side rails would be capable of securing the vehicles by latching at an angle, thereby cradling the wheels of the vehicles. As such, there remains a need for angle-adjustable connectors capable of locking side rails at a desired angle.

SUMMARY OF THE INVENTION

Specific aspects of embodiments of the invention include:

Aspect 1, which is an angle-adjustable connector comprising: an axis pin; an angle-adjustment pin; a first component comprising: a first through hole extending from a first side of the first component to a second side of the first component; and one or more groove extending across a surface of the first component and parallel to the first through hole and configured to receive the angle-adjustment pin; and a second component comprising: a set of axis pin holes configured to receive the axis pin, with a first axis pin hole disposed on a first side of the second component and a second axis pin hole aligned with the first axis pin hole and disposed on a second side of the second component; and a set of angle-adjustment holes configured to receive the angle-adjustment pin, with a first adjustment hole disposed on a first side of the second component and a second adjustment hole aligned with the first adjustment hole and disposed on a second side of the second component; wherein the axis pin is disposed within the first through hole of the first component and within the set of axis pin holes of the second component in a manner such that the first and second components are capable of movement about the axis pin; and wherein the second component is capable of being positioned relative to the first component by alignment of the set of angle-adjustment holes of the second component with a selected groove of the first component and fixed by placement of the angle-adjustment pin within the set of adjustment holes and the selected groove.

Aspect 2 is the angle-adjustable connector of Aspect 1, wherein the first component further comprises a second through hole extending from the first side of the first component to the second side of the first component.

Aspect 3 is the angle-adjustable connector of Aspect 1 or 2, wherein the first component further comprises a third through hole extending from the first side of the first component to the second side of the first component.

Aspect 4 is the angle-adjustable connector of any of Aspects 1-3, wherein the distance between the first and second through holes is shorter than the distance between the second and third through holes.

Aspect 5 is the angle-adjustable connector of any of Aspects 1-4, wherein the second component further comprises one or more connection hole disposed on a third side of the second component.

Aspect 6 is the angle-adjustable connector of any of Aspects 1-5, wherein the second component further comprises one or more access hole disposed on a fourth side of the second component.

Aspect 7 is the angle-adjustable connector of any of Aspects 1-6, wherein the center of a first connection hole is aligned with the center of a first access hole.

Aspect 8 is the angle-adjustable connector of any of Aspects 1-7, wherein the first connection hole has a smaller diameter than the first access hole.

Aspect 9 is the angle-adjustable connector of any of Aspects 1-8, wherein the first component comprises 2 to 5 grooves.

Aspect 10 is the angle-adjustable connector of any of Aspects 1-9, wherein each groove is spaced equidistantly from the first through hole.

Aspect 11 is the angle-adjustable connector of any of Aspects 1-10, further comprising one or more T-slot nut(s) disposed in the one or more connection hole.

Aspect 12 is a modular system comprising: one or more angle-adjustable connector comprising one or more T-slot nut; and one or more rail comprising one or more slot; wherein the one or more rail is configured to be connected to the one or more angle-adjustable connector by sliding along the T-slot nut of the adjustable connector.

Aspect 13 is the modular system of Aspect 12, comprising two angle-adjustable connectors.

Aspect 14 is the modular system of Aspect 12 or 13, comprising an odd or even number of rails.

Aspect 15 is the modular system of any of Aspects 12-14, wherein: the angle-adjustable connector comprises: an axis pin, an angle-adjustment pin, and first and second components; the first component comprising: a first through hole configured to receive the axis pin; and one or more groove configured to receive the angle-adjustment pin; the second component comprising: axis pin holes configured to receive the axis pin; and angle-adjustment holes configured to receive the angle-adjustment pin; wherein the second component is capable of being positioned relative to the first component by alignment of the angle-adjustment holes of the second component with a selected groove of the first component and by placement of the angle-adjustment pin within the set of adjustment holes and the selected groove.

Aspect 16 is the modular system of any of Aspects 12-15, comprising three rails.

Aspect 17 is the modular system of any of Aspects 12-16, wherein the angle-adjustable connectors are configured to be adjusted to a position at an angle between −90° and 90°, optionally fixed by an angle-adjustment pin.

Aspect 18 is a kit for attaching angle-adjustable side rails to a flatbed truck or trailer, the kit comprising: two or more pairs of angle-adjustable connectors, each angle-adjustable connector comprising: an angle-adjustment pin; an axis pin; two anchoring pins; first and second components capable of connection by way of the axis pin and capable of adjustment by way of the angle-adjustment pin; and one or more T-slot nut; and one or more rails, each comprising a slot configured to accept a T-slot nut.

Aspect 19 is the kit of Aspect 18, wherein the angle-adjustable connectors are configured to anchor the rails horizontally relative to the flatbed or trailer.

Aspect 20 is the kit of Aspect 19, wherein the angle-adjustable connectors are configured to provide the second component at one of several positions disposed at an angle between −90° and 90° relative to the first component and/or a bed of the truck or trailer.

BRIEF DESCRIPTION OF THE DRAWINGS

The accompanying drawings illustrate certain aspects of implementations of the present disclosure, and should not be construed as limiting. Together with the written description the drawings serve to explain certain principles of the disclosure.

FIGS. 5A-B are drawings showing left- and right-side views of a modular system installed into a trailer bracket according to an embodiment of the invention.

DETAILED DESCRIPTION OF VARIOUS EMBODIMENTS OF THE INVENTION

Figure 1A:
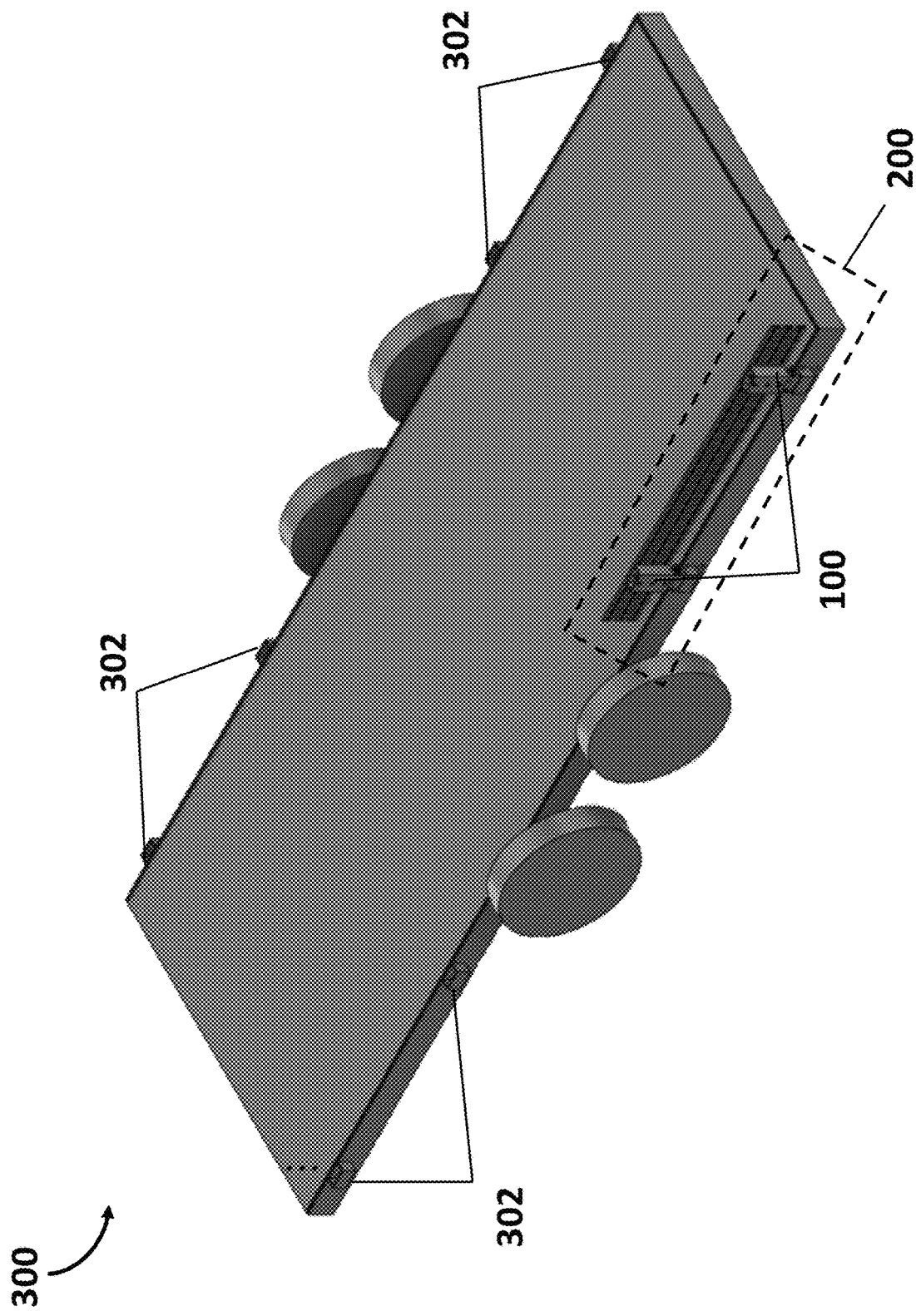
FIG. 1A is a drawing showing an isometric view of a trailer with a modular system according to an embodiment of the invention.

The detailed description provided below is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The present invention comprises an angle-adjustable connector 100. In embodiments, the invention includes a modular system 200 comprising the angle-adjustable connector 100 and one or more side rails 202 for use with one or more trailer 300 by connection with one or more trailer bracket 302. In other embodiments, one or more angle-adjustable connector 100 and one or more side rail(s) 202 are configured to be compatible with one or more flatbed truck.

Figure 1B:
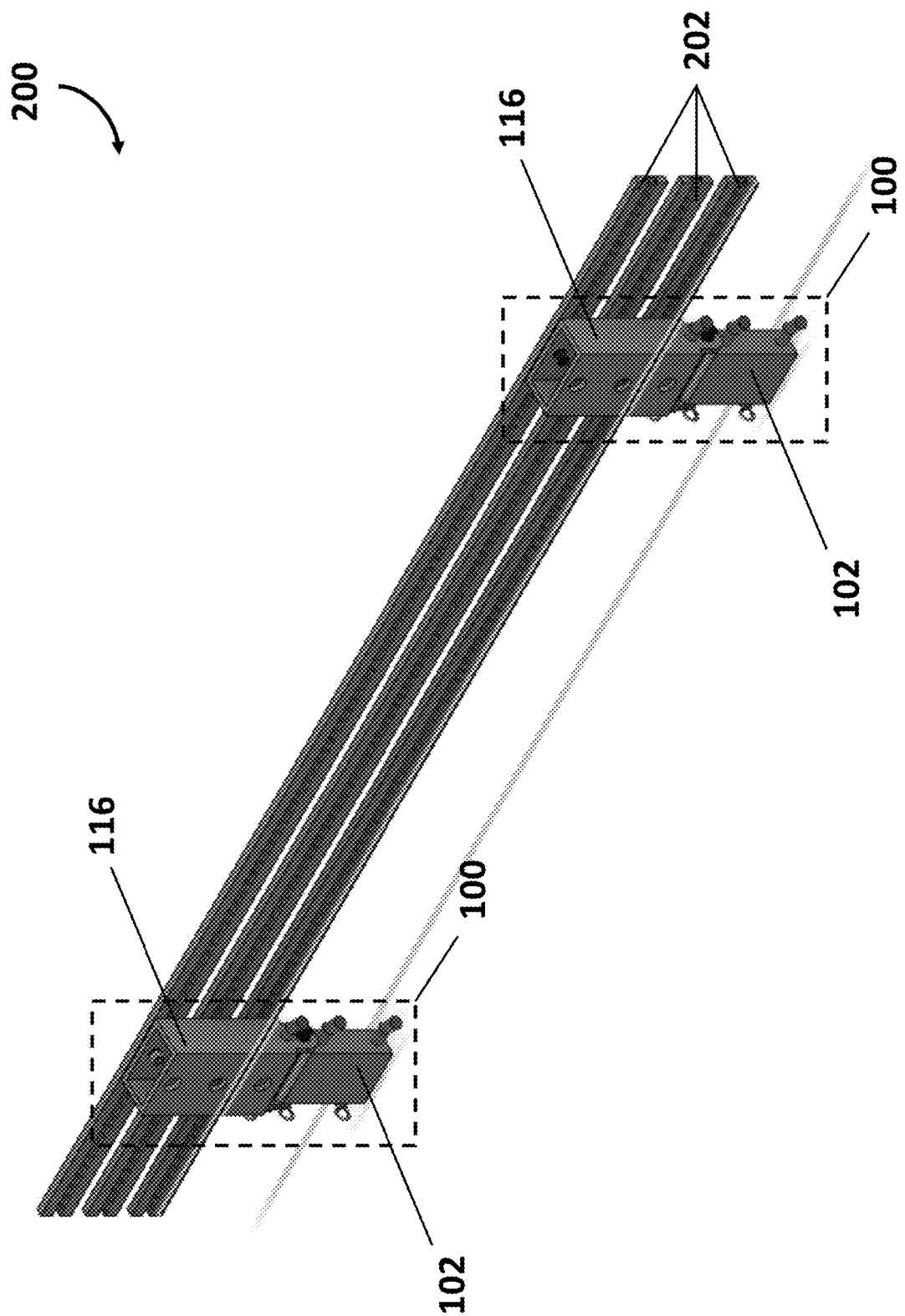
FIGS. 1B-C are drawings showing front perspective (FIG. 1B) and back perspective (FIG. 1C) views of the modular system shown in FIG. 1A.
Figure 1C:
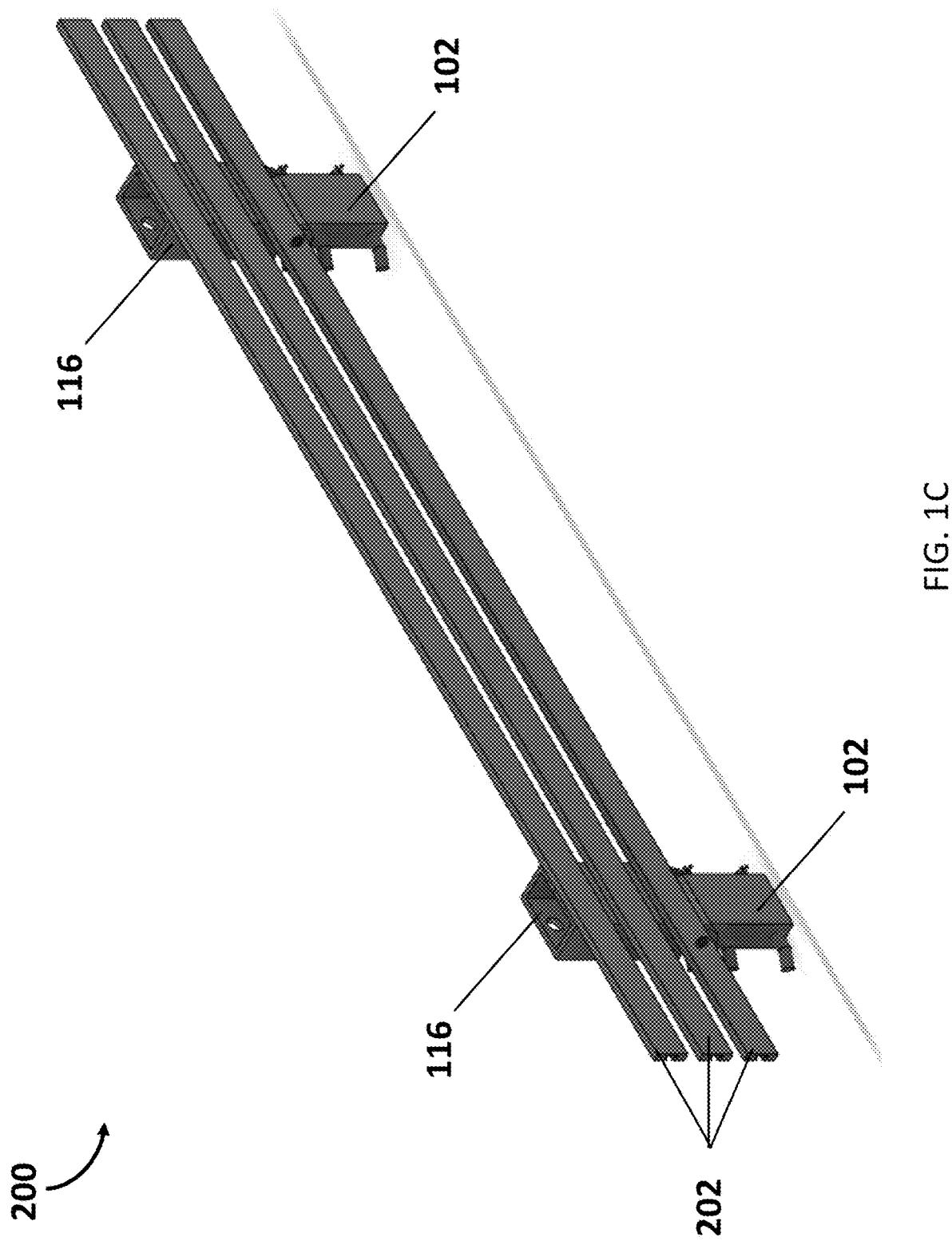

FIGS. 1A-C show a trailer 300 with a modular system 200 comprising two angle-adjustable connectors 100 and three side rails 202 according to an embodiment of the invention.

Figure 2A:
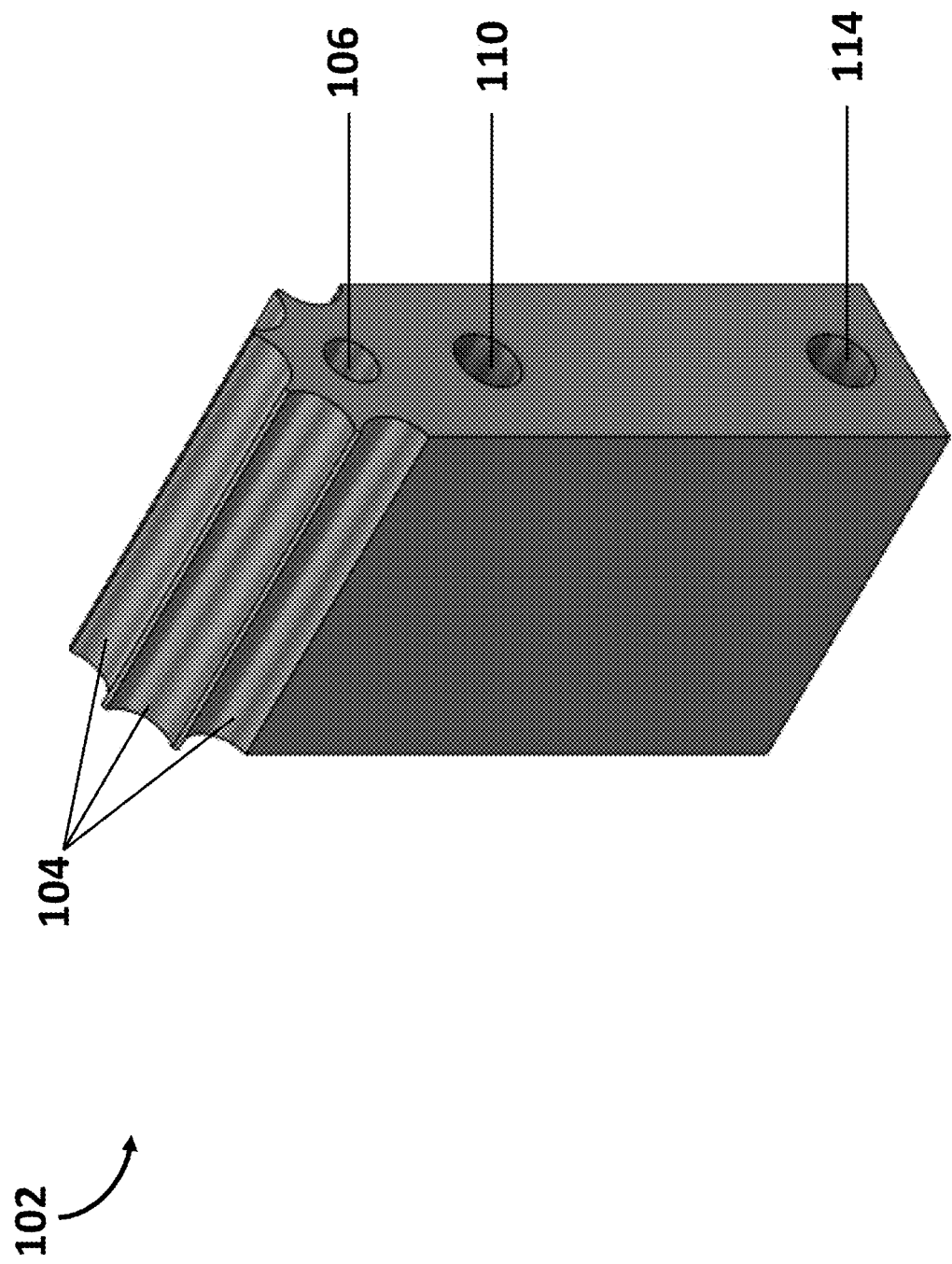
FIGS. 2A-C are drawings showing an isometric view (FIG. 2A), a side view (FIG. 2B), and a front view (FIG. 2C) of a first component of an angle-adjustable connector according to an embodiment of the invention.
Figure 2C:
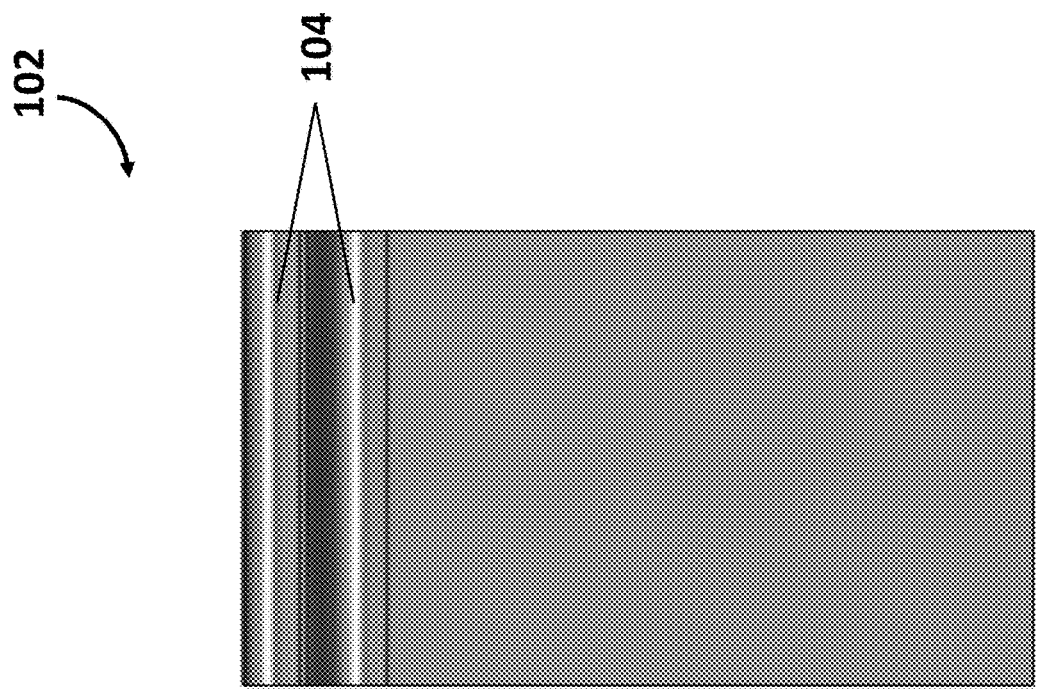
Figure 2B:
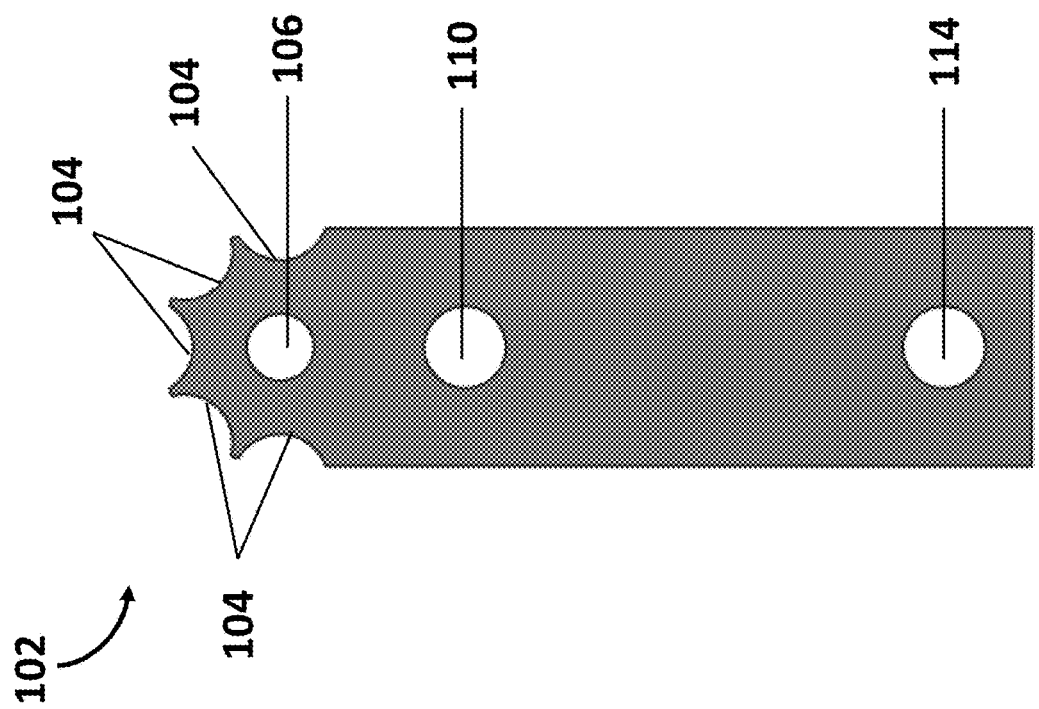
Figure 3A:
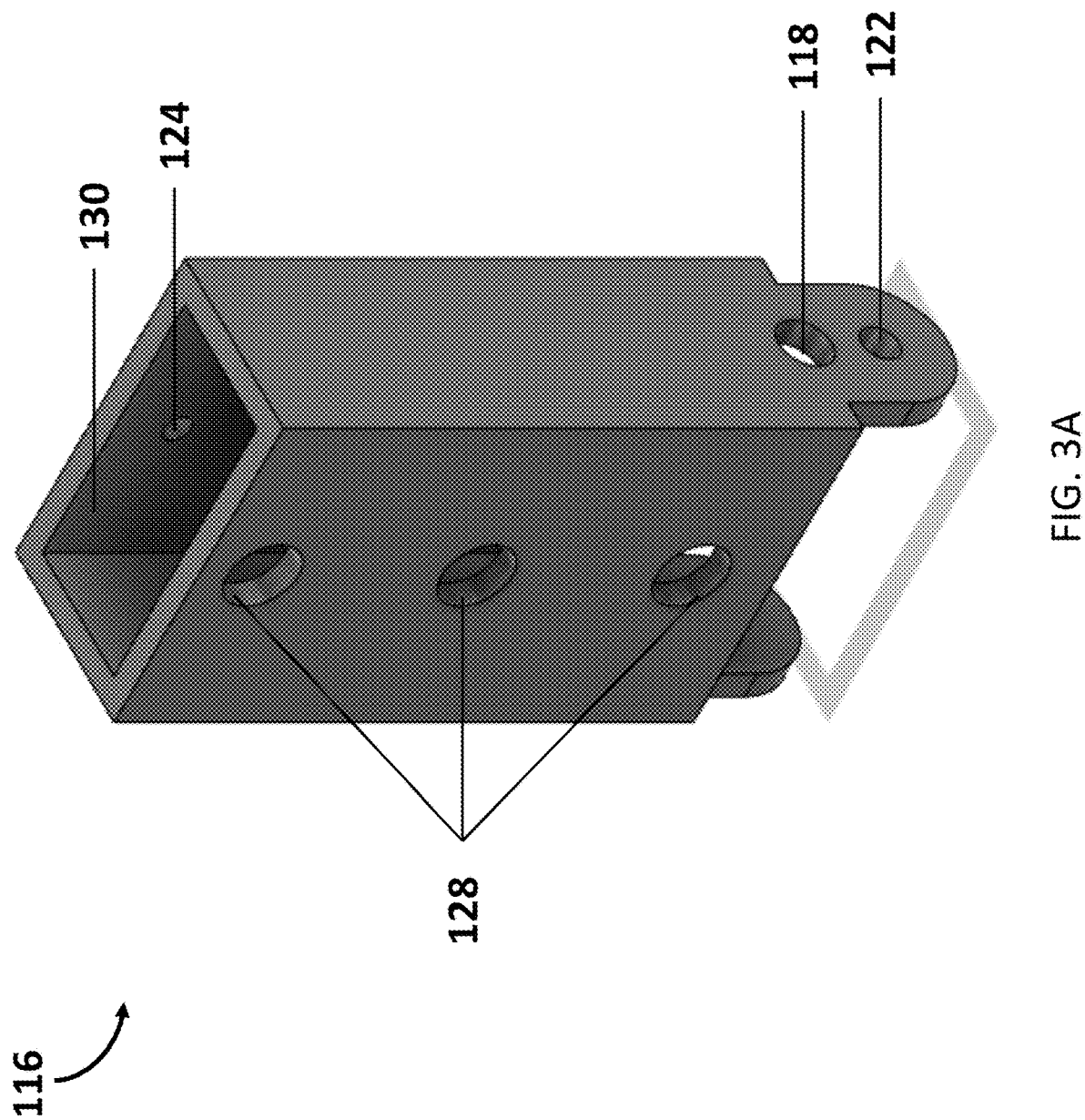
FIGS. 3A-C are drawings showing an isometric view (FIG. 3A), a side view (FIG. 3B), and a front view (FIG. 3C) of a second component of an angle-adjustable connector according to an embodiment of the invention.
Figure 3C:
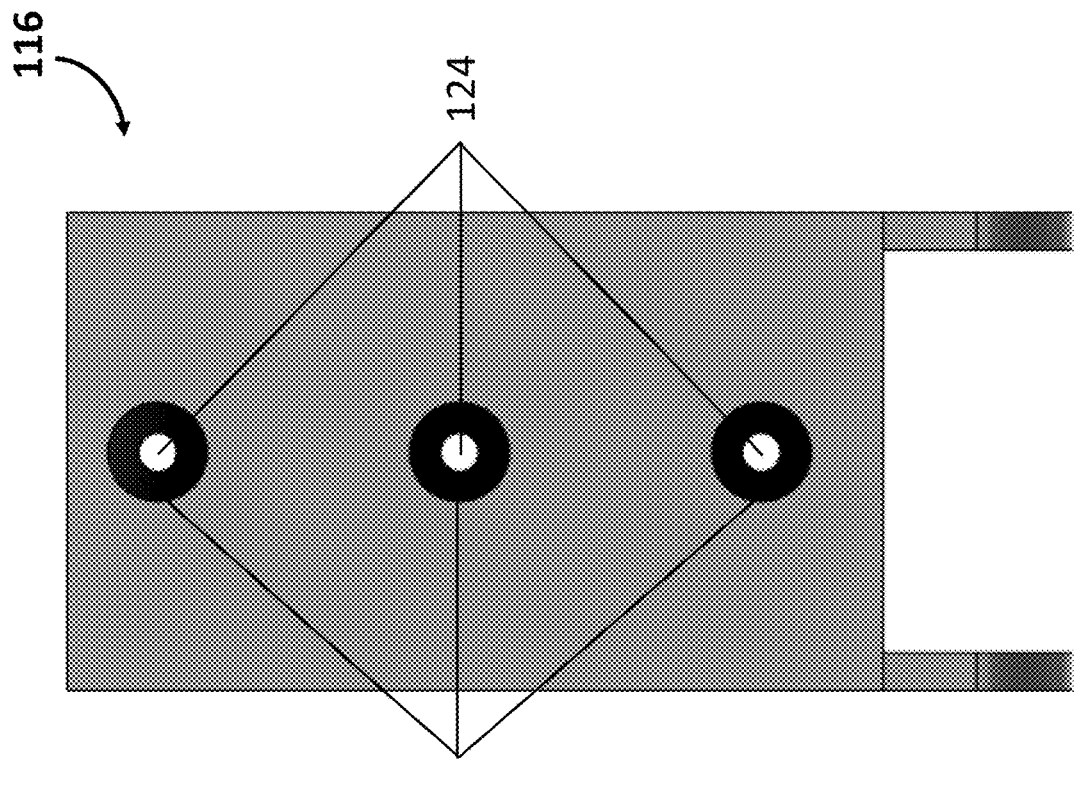
Figure 3B:
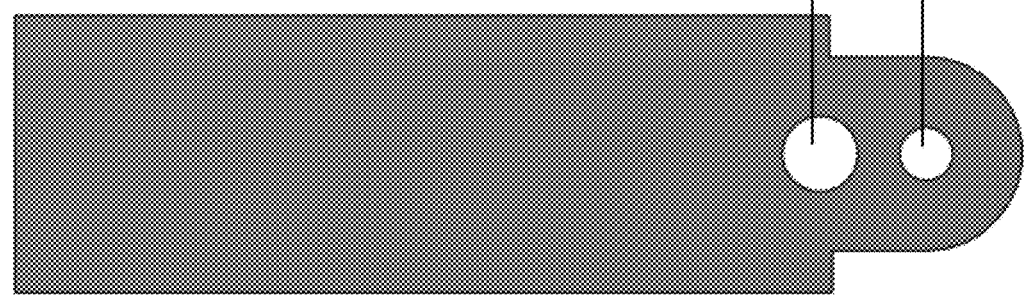

As best shown in FIGS. 2A-C, the angle-adjustable connector 100 comprises an adjustable stake (first component) 102 comprising two or more grooves 104 configured to allow for angle adjustment of the angle-adjustable connector 100. In embodiments, the invention comprises up to 10 grooves 104, such as up to 3, 4, 5, 6, 7, 8, or 9 grooves 104. In embodiments, the invention comprises an odd number of grooves 104. In other embodiments, the invention comprises an even number of grooves 104. Selection of the number and placement of the grooves 104 can be made to achieve any particular range of adjustment of the angle-adjustable connector 100 for example over a range of motion of about 60°, about 90°, about 180°, about 240°, or about 270°.

The first component, an adjustable stake 102, further comprises a first through hole (axis pin hole) 106, shaped and sized to accommodate an axis pin 108, a second through hole (top anchoring pin hole) 110 configured to accept a top anchor pin 112, and a third through hole (bottom anchoring pin hole) 114 configured to accept a bottom anchor pin 115. In embodiments, the top anchoring pin hole 110 and the bottom anchoring pin hole 114 are spaced such that, when installed on a trailer 300, the top anchoring pin hole 110 is above the trailer bracket 302 and the bottom anchoring pin hole 112 is below the trailer bracket 302.

The angle-adjustable connector 100 further comprises a second component 116. The second component 116 comprises a set of angle-adjustment holes 118 and a set of axis pin holes 122. When the angle-adjustable connector 100 is assembled, the set of angle-adjustment holes 118 is configured to be aligned with one or more groove 104 on the adjustable stake 102, such that an angle-adjustment pin 120 passes through the set of angle-adjustment holes 118. The set of axis pin holes 122 is disposed such that, upon assembly, the set of axis pin holes 122 aligns with the axis pin hole 106 on the adjustable stake 102 to allow passage of axis pin 108. In embodiments, second component 116 further comprises one or more connection hole 124 sized and shaped to hold a T-slot nut 126 for securing one or more side rails 202. In embodiments, the second component 116 comprises one or more access hole 128 located and sized to provide access to one or more connection hole(s) 124. In embodiments, the top 130 of the second component 116 is open. In other embodiments, the top of the second component 116 is closed (not shown).

In embodiments, the second component 116 comprises equal or unequal numbers of access holes 128 and connection holes 124. In other embodiments, the second component 116 comprises up to 10 connection holes 124, such as 1, 2, 3, 4, 5, 6, 7, 8, or 9 connection holes 124. In embodiments, the second component 116 comprises up to 10 access holes 128, such as 1, 2, 3, 4, 5, 6, 7, 8, or 9 access holes 128. In embodiments, the second component 116 comprises no access holes 128.

In an embodiment, the first component (adjustable stake) 102 and second component 116 are sized and shaped such that they form a male to female connection. In embodiments, the adjustable stake 102 acts as the male portion of the joint and the second component 116 acts as the female portion of the joint.

Figure 4A:
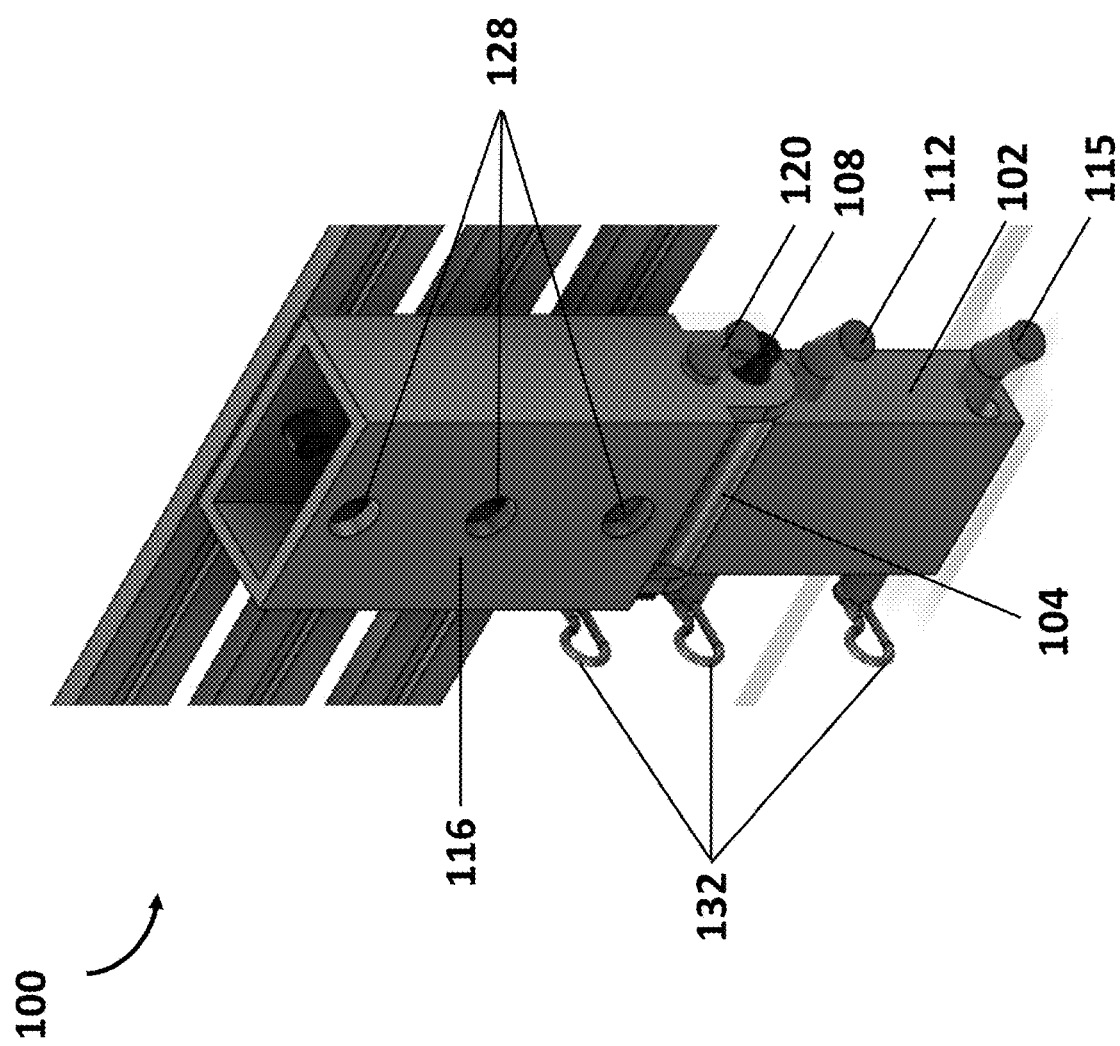
FIGS. 4A-B are drawings showing perspective (FIG. 4A) and top (FIG. 4B) views of a modular system according to an embodiment of the invention.
Figure 4B:
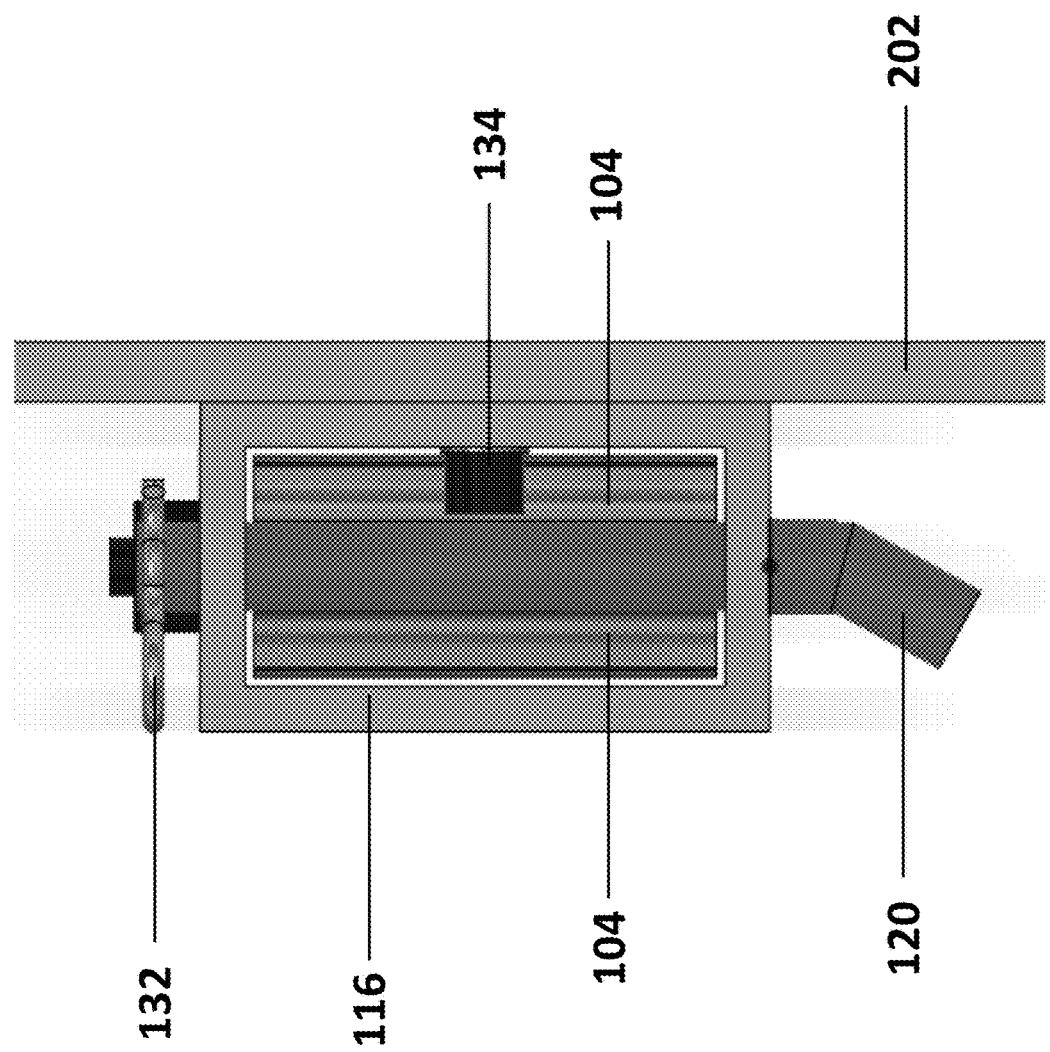
Figures 6A, 6B, 6C, 6D, 6E:
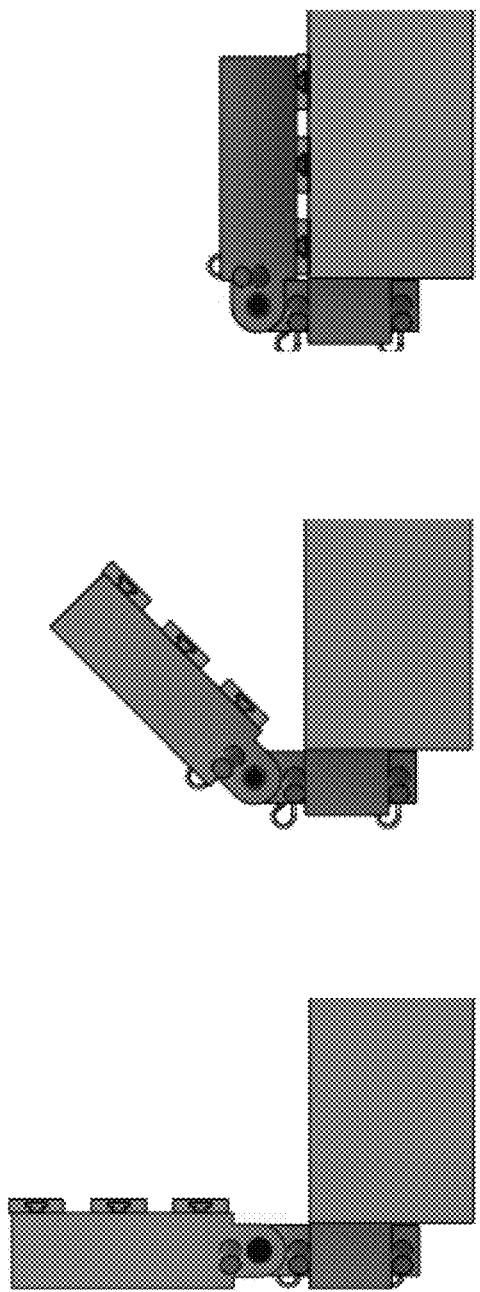
FIGS. 6A-E are drawings showing side views of an angle-adjustable connector at several angles including 0° (FIG. 6A), −45° (FIG. 6B), −90° (FIG. 6C), 45° (FIG. 6D), and 90° (FIG. 6E).

FIGS. 4A-B show the assembled angle-adjustable connector 100. As shown in FIG. 4A, one or more of the angle-adjustment pin 120, axis pin 108, top anchor pin 112, and/or bottom anchor pin 115 are secured by one or more cotter pin 132. In some embodiments, one or more of the angle-adjustment pin 120, axis pin 108, top anchor pin 112, and/or bottom anchor pin 115 is a bolt secured with one or more nut and/or washer. In other embodiments, one or more of the angle-adjustment pin 120, axis pin 108, top anchor pin 112, and/or bottom anchor pin 115 is a wire lock pin, tab lock pin, ball lock pin, clevis pin, pull ring detent pin, ball knob detent pin, lynch pin, bent arm pin, ring pin, headless pin with grooves, or headless pin with holes. In embodiments, one or more of the pins is secured with a bow tie cotter, hair pin cotter, double loop hair pin cotter, circle cotter, S-hook, infinity S-hook, kickout ring, split key ring, or rue ring.

In an embodiment, the axis pin 108 is a bolt secured with a nut 109 and washer. In an embodiment, the angle-adjustment pin 120, top anchor pin 112, and bottom anchor pin 115 are bent angle pins secured with cotters 132.

In an embodiment, the second component 116 comprises one or more connection hole 124 configured to receive one or more bolt 134 and T-slot nut 126. In embodiments, the one or more side rail 202 is a T-slot side rail and connects to the angle-adjustable connector 100 by sliding onto the one or more T-slot nut 126. In embodiments, one or more side panel is substituted for the side rail.

FIGS. 5A-B show left- and right-side views of the modular system 200 installed into a trailer bracket 302 according to an embodiment of the invention. The angle-adjustable connector 100 (first component 102 and second component 116) is secured in the trailer bracket 302 by the top anchor pin 112 and the bottom anchor pin 115.

In an embodiment of the invention, angle-adjustment pin 120 is removed, the second component 116 is positioned to the desired angle, and the angle-adjustment pin 120 is slid through the set of angle-adjustment holes 118 of the second component 116 along groove 104 of the first component 102. Example angles, according to embodiments of the invention, are shown in FIGS. 6A-E. The presence of additional grooves 104 allows for additional possible angles. In embodiments, the adjustable connectors are configured to be adjusted to an angle between about −90° and 90°, such as about −60°, −45°, −30°, 0°, 30°, 45°, or 60°. In embodiments, the adjustable connectors 100 are configured to be adjusted over a range of motion of about 60°, about 90°, about 180°, about 240°, or about 270°.

In an embodiment of the invention, one or more adjustable connector 100 and one or more side rail(s) 202 may be attached to a vehicle, such as a truck, flatbed truck, or trailer such that the adjustable connector 100 and the side rail(s) 202 act as an adjustable side rail or tailgate. In embodiments, the one or more adjustable connector 100 attaches to the truck via a stake hole.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Any of the methods disclosed herein can be used with any of the compositions disclosed herein or with any other compositions. Likewise, any of the disclosed compositions can be used with any of the methods disclosed herein or with any other methods. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. An angle-adjustable connector comprising:
an axis pin;
an angle-adjustment pin;
a first component and a second component configured to be capable of connection by way of the axis pin and configured to be capable of angle adjustment to 3 or more angles by way of the angle-adjustment pin;
wherein the first component comprises:
a first through hole extending from a first side of the first component to a second side of the first component, wherein the first through hole is configured to receive the axis pin; and
three or more grooves configured to receive the angle-adjustment pin;
wherein, when installed, the angle-adjustment pin is configured to:
rest in a first adjustment hole disposed on a first side of the second component and a second adjustment hole aligned with the first adjustment hole and disposed on a second side of the second component; and
rest in a selected groove of the three or more grooves;
wherein the selected groove of the three or more grooves is disposed between the first adjustment hole and the second adjustment hole.

2. The angle-adjustable connector of claim 1, wherein the second component comprises:
a pair of axis pin holes configured to receive the axis pin, with a first axis pin hole disposed on a first side of the second component and a second axis pin hole aligned with the first axis pin hole and disposed on a second side of the second component.

3. The angle-adjustable adjustable connector of claim 2, wherein:
the axis pin is configured to be disposed within the first through hole of the first component and within the first and second axis pin holes of the second component in a manner such that the first and second components are capable of movement about the axis pin.

4. The angle-adjustable connector of claim 1, wherein the second component further comprises one or more connection holes disposed on a third side of the second component.

5. The angle-adjustable connector of claim 4, wherein the second component further comprises one or more access holes disposed on a fourth side of the second component.

6. The angle-adjustable connector of claim 5, wherein the center of a first connection hole of the one or more connection holes of the second component is aligned with the center of a first access hole of the one or more access holes of the second component.

7. The angle adjustable connector of claim 6, wherein the first connection hole of the one or more connection holes of the second component has a smaller diameter than the first access hole of the one or more access holes of the second component.

8. The angle-adjustable connector of claim 1, wherein the first component comprises 3 to 5 grooves.

9. The angle-adjustable connector of claim 8, wherein each of the 2 to 4 grooves is spaced equidistantly from the first through hole.

10. The angle-adjustable connector of claim 4, further comprising one or more T-slot nut(s) configured to be disposed in the one or more connection holes.

11. A modular system comprising:
one or more angle-adjustable connector comprising;
an angle-adjustment pin;
an axis pin; and
first and second components configured to be capable of connection by way of the axis pin and configured to be capable of angle adjustment to 3 or more angles by way of the angle-adjustment pin; and
one or more rail
configured to be connected to the one or more angle-adjustable connector;
wherein the first component comprises:
a first through hole extending from a first side of the first component to a second side of the first component, wherein the first through hole is configured to receive the axis pin; and
three or more grooves configured to receive the angle-adjustment pin;
wherein, when installed, the angle-adjustment pin is configured to:
rest in a first adjustment hole disposed on a first side of the second component and a second adjustment hole aligned with the first adjustment hole and disposed on a second side of the second component; and
rest in a selected groove of the three or more grooves; and
wherein the selected groove of the three or more grooves is disposed between the first adjustment hole and the second adjustment hole.

12. The modular system of claim 11, comprising two angle-adjustable connectors.

13. The modular system of claim 11, comprising an odd or even number of rails.

14. The modular system of claim 11, wherein:
the second component comprises:
axis pin holes configured to receive the axis pin; and
a pair of angle-adjustment holes configured to receive the angle-adjustment pin.

15. The modular system of claim 12, comprising three rails.

16. The modular system of claim 11, wherein the angle-adjustable connector is configured to be adjusted to a position at an angle between −90° and 90°.

17. A kit for attaching an angle-adjustable side rail to a flatbed truck or trailer, the kit comprising:
one or more pair of angle-adjustable connectors, each angle-adjustable connector comprising:
an angle-adjustment pin;
an axis pin;
first and second components configured to be capable of connection by way of the axis pin and configured to be capable of angle adjustment to 3 or more angles by way of the angle-adjustment pin; and
one or more rails configured for attachment to the one or more pair of angle-adjustable connectors;
wherein the first component comprises:
a first through hole extending from a first side of the first component to a second side of the first component, wherein the first through hole is configured to receive the axis pin; and
three or more grooves configured to receive the angle-adjustment pin;
wherein, when installed, the angle-adjustment pin is configured to:
rest in a first adjustment hole disposed on a first side of the second component and a second adjustment hole aligned with the first adjustment hole and disposed on a second side of the second component; and
rest in a selected groove of the three or more grooves; and
wherein the selected groove of the three or more grooves is disposed between the first adjustment hole and the second adjustment hole.

18. The kit of claim 17, wherein the angle-adjustable connectors are configured to anchor the one or more rails horizontally relative to the flatbed truck or trailer.

19. The kit of claim 18, wherein the angle-adjustable connectors are configured to provide the second component at one of several positions disposed at an angle between −90° and 90° relative to the first component and/or a bed of the truck or trailer.

20. The angle-adjustable connector of claim 1, wherein the angle-adjustable connector is configured to have a range of adjustment selected from between about 120° and about 270°.

* * * * *